(12) United States Patent
Chan et al.

(10) Patent No.: US 9,524,151 B2
(45) Date of Patent: Dec. 20, 2016

(54) CONTEXT SENSITIVE DISTRIBUTED FILE SYSTEM SYNCHRONIZATION AND MERGING SEMANTICS

(71) Applicant: NEXTBIT SYSTEMS INC., San Francisco, CA (US)

(72) Inventors: Michael A. Chan, San Francisco, CA (US); Justin Quan, San Francisco, CA (US); Daniel R. Bornstein, San Francisco, CA (US); Tom Moss, Los Altos, CA (US); Linda Tong, San Francisco, CA (US)

( * ) Notice: Subject to any disclaimer, the term of this patent is extended or adjusted under 35 U.S.C. 154(b) by 90 days.

(21) Appl. No.: 14/222,374

(22) Filed: Mar. 21, 2014

(65) Prior Publication Data

US 2014/0289191 A1    Sep. 25, 2014

Related U.S. Application Data

(60) Provisional application No. 61/804,134, filed on Mar. 21, 2013.

(51) Int. Cl.

| | |
|---|---|
| *G06F 17/30* | (2006.01) |
| *G06F 9/45* | (2006.01) |
| *G06F 9/54* | (2006.01) |
| *H04L 29/08* | (2006.01) |
| *G06F 11/14* | (2006.01) |
| *H04L 12/24* | (2006.01) |
| *H04L 12/911* | (2013.01) |
| *H04L 29/06* | (2006.01) |
| *H04W 12/06* | (2009.01) |

(52) U.S. Cl.
CPC . *G06F 8/44* (2013.01); *G06F 9/54* (2013.01); *G06F 11/1464* (2013.01); *G06F 17/3053* (2013.01); *G06F 17/30174* (2013.01); *G06F 17/30194* (2013.01); *G06F 17/30575* (2013.01); *H04L 41/0816* (2013.01); *H04L 47/70* (2013.01); *H04L 47/78* (2013.01); *H04L 63/0853* (2013.01); *H04L 67/10* (2013.01); *H04L 67/1095* (2013.01); *H04L 69/04* (2013.01); *H04W 12/06* (2013.01); *G06F 11/1451* (2013.01); *G06F 11/1469* (2013.01)

(58) Field of Classification Search
USPC .................................................. 707/610, 716
See application file for complete search history.

(56) References Cited

U.S. PATENT DOCUMENTS

| | | | |
|---|---|---|---|
| 6,505,214 B1 * | 1/2003 | Sherman | G06F 17/30578 |
| 6,512,651 B1 * | 1/2003 | Eifert | G11B 27/322 |
| | | | 360/77.13 |
| 7,991,734 B2 * | 8/2011 | Park | G06F 17/30 |
| | | | 707/609 |

(Continued)

*Primary Examiner* — Kim Nguyen

(57) ABSTRACT

Technology is disclosed for context sensitive synchronization of a distributed cloud-based file system across multiple devices and for providing seamless merging of conflicting data objects. In some embodiments, data objects of a user are stored across multiple computing devices associated with a user, e.g., mobile computing devices such as a tablet, a laptop, or a smartphone, and/or at server systems, e.g., cloud-based storage servers, in a distributed cloud-based storage system. The described technology intelligently synchronizes the data objects based on context and manages potential conflicts.

16 Claims, 12 Drawing Sheets

(56) References Cited

U.S. PATENT DOCUMENTS

| | | | | |
|---|---|---|---|---|
| 8,065,294 B2* | 11/2011 | Travieso | ............... | G06F 17/289 |
| | | | | 707/610 |
| 8,135,690 B2* | 3/2012 | Eidt | ......................... | G06F 9/52 |
| | | | | 707/704 |
| 9,171,050 B2* | 10/2015 | Lu | ..................... | G06F 17/30575 |
| 2002/0194177 A1* | 12/2002 | Sherman | ........... | G06F 17/30578 |
| 2012/0094721 A1* | 4/2012 | Brondmo | .............. | H04L 12/588 |
| | | | | 455/566 |
| 2014/0172783 A1* | 6/2014 | Suzuki | ...................... | G06F 8/63 |
| | | | | 707/609 |
| 2014/0201144 A1* | 7/2014 | Vibhor | ............... | H04L 29/0854 |
| | | | | 707/634 |

* cited by examiner

275

| Header 510a | | Thumbnail 510a |
| Header 510b | | Thumbnail 510a |
| ⋮ | | |
| Header 510n | | Thumbnail 510a |

0 ... Max_Sz

CONTEXT SENSITIVE DISTRIBUTED FILE SYSTEM SYNCHRONIZATION AND MERGING SEMANTICS

PRIORITY CLAIM

This application claims the benefit of U.S. Provisional Patent Application No. 61/804,134, entitled "OPERATING SYSTEM AND DEVICE INTEGRATED WITH CLOUD COMPUTING FUNCTIONALITIES", filed on Mar. 21, 2013, which is incorporated by reference herein in its entirety.

FIELD OF THE INVENTION

At least one of the disclosed embodiments relate to cloud computing, and more particularly, to techniques for context sensitive synchronization of data objects in a distributed file system with seamless merging of conflicting data objects.

BACKGROUND

Use of computing devices to perform various tasks has become ubiquitous. For example, a person may use any number of computing devices to perform various tasks throughout the course of a day. Often, any one of these devices can be used to perform one or more of the various tasks. However, once a user begins a task on a particular computing device, there is very limited ability to continue that task on a different computing device. That is, the computing devices do not automatically synchronize with each other to facilitate migration of a task among the different computing devices.

Furthermore, even if the computing devices were able to synchronize with one another to facilitate migration of a task among different computing devices, such synchronization would not be performed intelligently. For example, data stored on a first computing device may synchronized to a second computing device even when the second computing device is unlikely to use some or all of that data.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

FIGS. 2A-2D are block diagrams illustrating various examples of context sensitive synchronization techniques and seamless merging of conflicting data objects, according to an embodiment.

DETAILED DESCRIPTION

Figure 1:
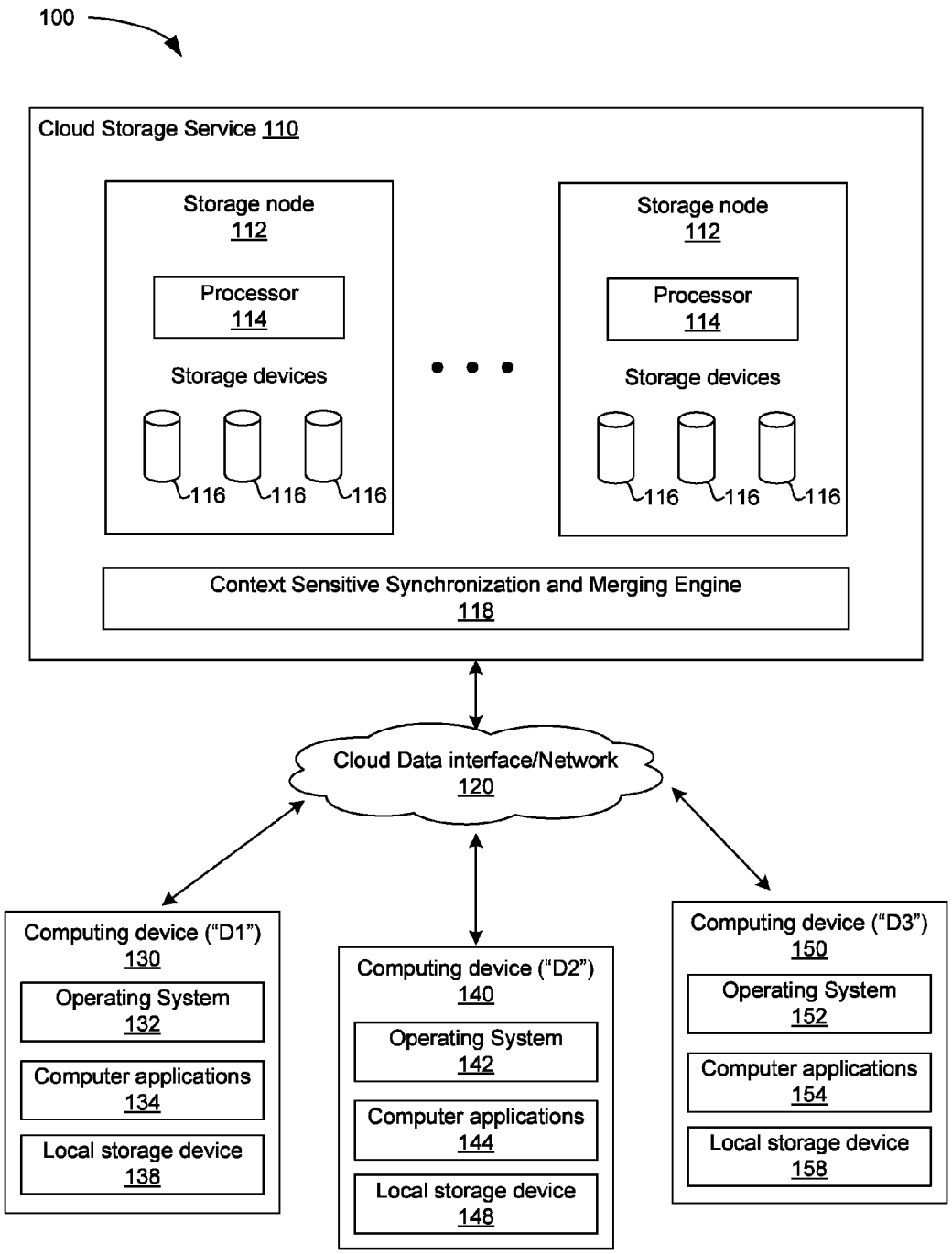
FIG. 1 is a block diagram illustrating an example cloud-based storage environment facilitating context sensitive synchronization and seamless merging of conflicting data objects.

Technology is disclosed for context sensitive synchronization of a distributed cloud-based file system across multiple devices and for providing seamless merging of conflicting data objects. In some embodiments, data objects of a user are stored across multiple computing devices associated with a user, e.g., mobile computing devices such as a tablet, a laptop, or a smartphone, and/or at server systems, e.g., cloud-based storage servers, in a distributed cloud-based storage system. The described technology intelligently synchronizes the data objects based on local file system context and manages potential data object conflicts.

In some embodiments, the synchronization can be optimized based on expected access patterns associated with specific directories and/or file types. For example, when synchronizing a particular directory on a device, the system can identify applications installed on the device. The synchronization of files on the device can be optimized such that only the files and/or sub-directories associated with the installed applications are propagated, updated, and/or otherwise synchronized.

In some embodiments, the system can distinguish between various different activities occurring on or at a device during synchronization of the device with the distributed cloud-based file system. Distinguishing between various activities allows the system to synchronize (e.g., download and/or otherwise update files on the device) with minimal file system information (i.e., less than all of the file system information). For example, the system can distinguish media scan or thumbnailing activity occurring on the device from display activity occurring on the device and allow the media scan or thumbnailing activity to complete while updating only portions of some or all of the files. The ability to complete the media scan or thumbnailing activity while downloading or updating only portions of some or all of the files saves both bandwidth and memory (e.g., flash memory) space on the device.

In one embodiment, the system provides a custom media scanner that is closely coupled to the cloud service and, more particularly, the cloud-based file system. The custom media scanner can replace the media scanners provided with and/or built-in to the device's operating system. For example, the provided custom scanner described herein can replace the Android media scanner or the Apple iOS media scanner.

In some embodiments, the system also provides the ability to merge concurrent modifications to the same directory by opportunistically renaming conflicting files when the conflicting files are not being accessed by applications. For example, two or more devices can be taking pictures simultaneously. If the two devices use the same operating system and/or application, e.g., iPhone photo software, then the different photos from the different devices may have the same name. This can occur when, for example, the naming convention is based on timestamps. The system described herein identifies a conflicting photo, determines a device to modify the conflicting photo (i.e., the losing device), opportunistically directs the device to modify the name of the photo via an instruction that is sent to the losing device.

Other aspects of the technology introduced here will be apparent from the accompanying figures and from the detailed description which follows.

Environment

FIG. 1 is a block diagram illustrating an example cloud-based storage environment 100 facilitating context sensitive synchronization and seamless merging of conflicting data objects. The cloud-based storage environment 100 includes a cloud storage service 110, which can include one or more cloud-based storage servers that are configured to handle communications with computing devices 130-150. The cloud storage service 110 contains storage nodes 112. One or more storage nodes 112 may be referred to as a storage server or cloud storage server herein. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage, or any other computer storage medium which can be used to store the desired information.

A cloud data interface 120 can also be included to receive data from and send data to computing devices 130-150. The cloud data interface 120 can include network communication hardware and network connection logic to receive the information from computing devices. The network can be a local area network (LAN), wide area network (WAN), or the Internet. The cloud data interface 120 may include a queuing mechanism to organize data updates received from or sent to the computing devices 130-150.

In some embodiments, any communication between the computing devices 130-150 is routed through the cloud storage service 110. For example, data related to computer applications 134-154 or data files to be stored in the cloud-based storage environment 100, can be exchanged between the computing devices 130-150 through cloud storage service 110. In some embodiments, where the computing devices 130-150 can communicate with each other directly using a P2P communication technique, e.g. Bluetooth, the cloud storage service 110 facilitates the computing devices 130-150 to communicate directly for exchanging the data. In some embodiments, the computing devices 130-150 can communicate directly with each other without any coordination by the cloud storage service 110. In some embodiments, while the computing devices 130-150 send/receive the data directly, the cloud storage service 110 may also obtain a copy of the data.

Although FIG. 1 illustrates three computing devices 130, 140 and 150, a person having ordinary skill in the art will readily understand that the technology disclosed herein can be applied to any number of computing devices connected to the cloud storage service 110.

The computing devices 130-150 include operating systems 132-152 that manage hardware resources of the computing devices 130-150 and provide services for computer applications 134-154 (e.g., mobile applications running or executing on mobile devices). The operating systems 132-152 facilitate execution of the computer applications 134-154 on the computing devices 130-150. The computing devices 130-150 each include at least one local storage device 138-158, respectively, to store the computer applications 134-154 and/or user data. Each computing device 130-150 can be a desktop computer, a laptop computer, a tablet computer, an automobile computer, a game console, a smartphone, a personal digital assistant, or other computing devices capable of running computer applications, as contemplated by a person having ordinary skill in the art. Some examples of the operating system 132-152 include Android, iOS, Windows, etc.

The computer applications 134-154 stored in the computing devices 130-150 can include applications for general productivity and information retrieval, including email, calendar, contacts, stock market and weather information. The computer applications 134-154 can also include applications in other categories, such as mobile games, factory automation, GPS and location-based services, banking, order-tracking, ticket purchases, or any other categories as contemplated by a person having ordinary skill in the art.

The network connections between the computing devices 130-150 and the cloud storage service 110 can include, but are not limited to, Transmission Control Protocol (TCP) connections, User Datagram Protocol (UDP) connections, and/or other types of network connections based on other protocols. When multiple computer applications 134-154 need network connections to multiple remote servers, the computing devices 130-150 only need to maintain one network connection with the cloud storage service 110. The cloud storage service 110 can in turn maintain multiple connections with the remote servers on behalf of the computer applications 134-154.

In some embodiments, a user, e.g., a user associated with the computing devices 130-150, can synchronize and/or backup data files across multiple computing devices 130-150. Alternatively or additionally, the user can back up the data files to the cloud storage service 110. That is, the distributed cloud-based storage environment 100 facilitates synchronizing and/or backing up of the user's data files from the computing devices 130-150 to the cloud storage service 110 or from the cloud storage service 110 to the computing devices 130-150. The data files are synchronized or backed up across the computing devices 130-150 based on various policies. The policies can be designed to optimize the cloud-based storage environment 100 in various aspects, including to minimize the response time in accessing the data files, improving storage space utilization across the computing devices, or storing particular data files in a particular computing device based on the user preference, e.g., to provide convenience.

The cloud storage service 100 includes a distributed file system. That is, a data object can be stored on one or more devices and mirrored and/or synchronized with other devices having local file systems. For example, when a user requests access to a particular data file in the cloud storage service 100 using a particular computing device, e.g., computing device 130, the cloud storage service 100 or the computing device first determines whether the data object (e.g., file) is stored locally and whether it is up-to-date. If the file needs to be updated or is not stored locally, the data object can be requested from a cloud-based storage server, e.g., one or more storage nodes 112 of the cloud storage service 100.

In some embodiments, elements of the cloud storage service 110, e.g., one or more cloud storage servers, receive indication of a synchronization event. The synchronization event can indicate or initiate synchronization of the data objects in distributed file system. The cloud storage server(s) select a first computing device responsive to receiving the synchronization event. As discussed herein, the first computing device has a first local file system. The cloud storage server(s) determine expected access patterns of the first local file system by a user of the first computing device. The expected access patterns can be determined based on specific file directories of the first local file system. For example, the cloud storage server(s) and/or the computing device itself can recognize synchronization of a "sdcard/ Android" directory. The system responsively recognizes files in this directory as application identifiers and responsively determines an expected access pattern of the computing device—namely, that the computing device is expected to access only specific directories in the distributed file system associated with applications that are installed on the device.

FIGS. 2A-2D are block diagrams illustrating various examples of context sensitive synchronization techniques and seamless merging of conflicting data objects, according to an embodiment. The examples of FIGS. 2A-2D include cloud-based storage environment 200, cloud storage service 210, and computing devices D1 230 and D2 240. The cloud-based storage environment 200 could be storage cloud-based storage environment 200, although alternative configurations are possible. Similarly, cloud storage service 210 could be cloud-based storage service 110 of FIG. 1 and computing devices D1 and D2 could be computing devices D1 and D2 of FIG. 1, respectively, although alternative configurations are possible.

Figure 2A:
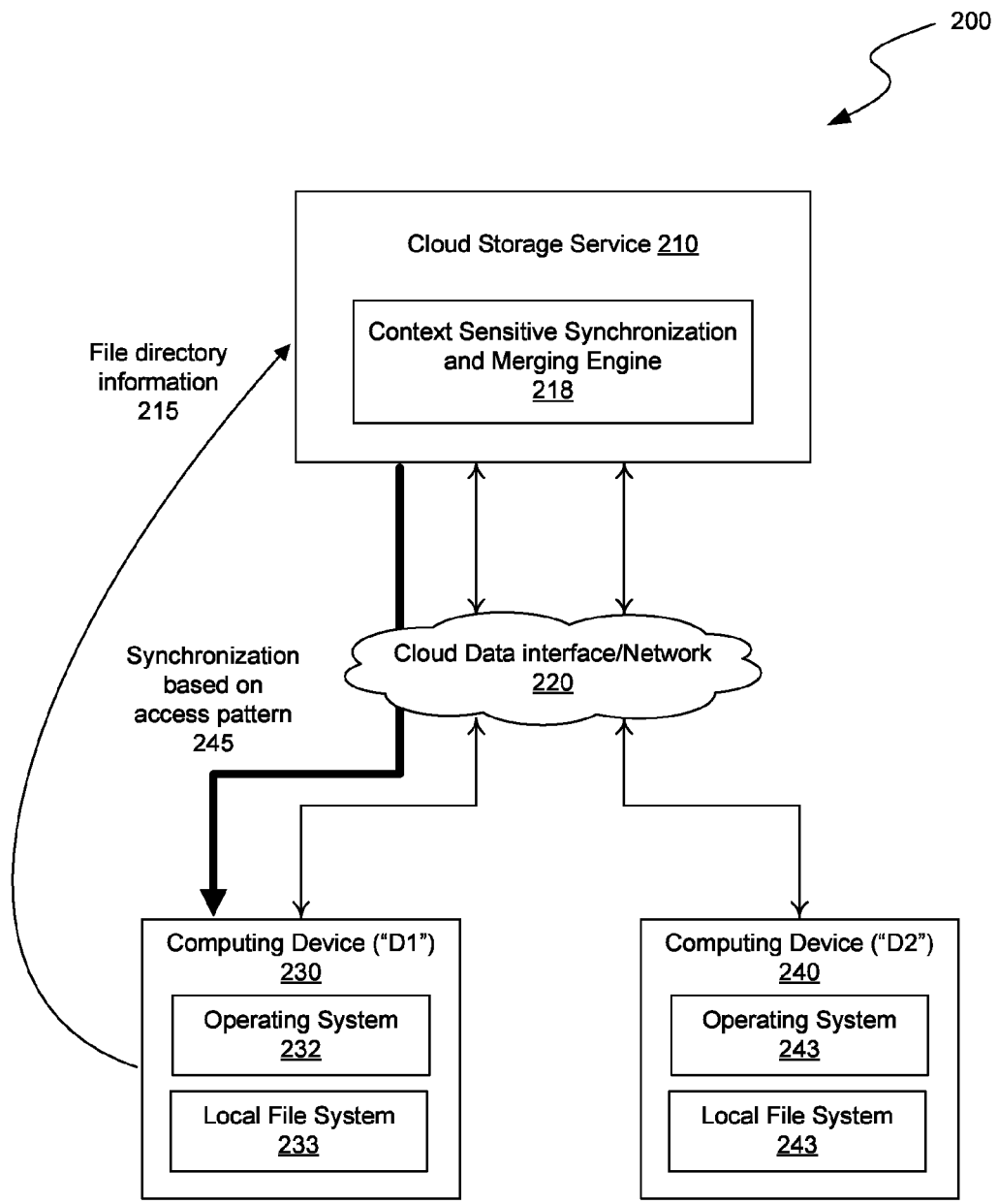

Referring first to FIG. 2A which illustrates the computing device D1 providing file directory information 215 to the cloud storage service 210, according to an embodiment. The context sensitive synchronization and merging engine 218 uses the file directory information to determine and/or otherwise identify an access pattern and subsequently synchronize the distributed file system (not shown) with the local file system 233 based on the access pattern.

In one embodiment, determining the expected access patterns of the distributed file system by the computing device D1 includes recognizing a first directory on the local file system 233, identifying files in the first file directory as application identifiers, scanning the application identifiers to identify the applications installed on the computing device D1, and determining the expected access pattern based on the applications installed on the computing device D1. The expected access pattern can, for example, identify directories associated with applications installed on the first computing device and thus, only these directories will be synchronized in the synchronization based on access pattern according to FIG. 2A.

Figure 2B:
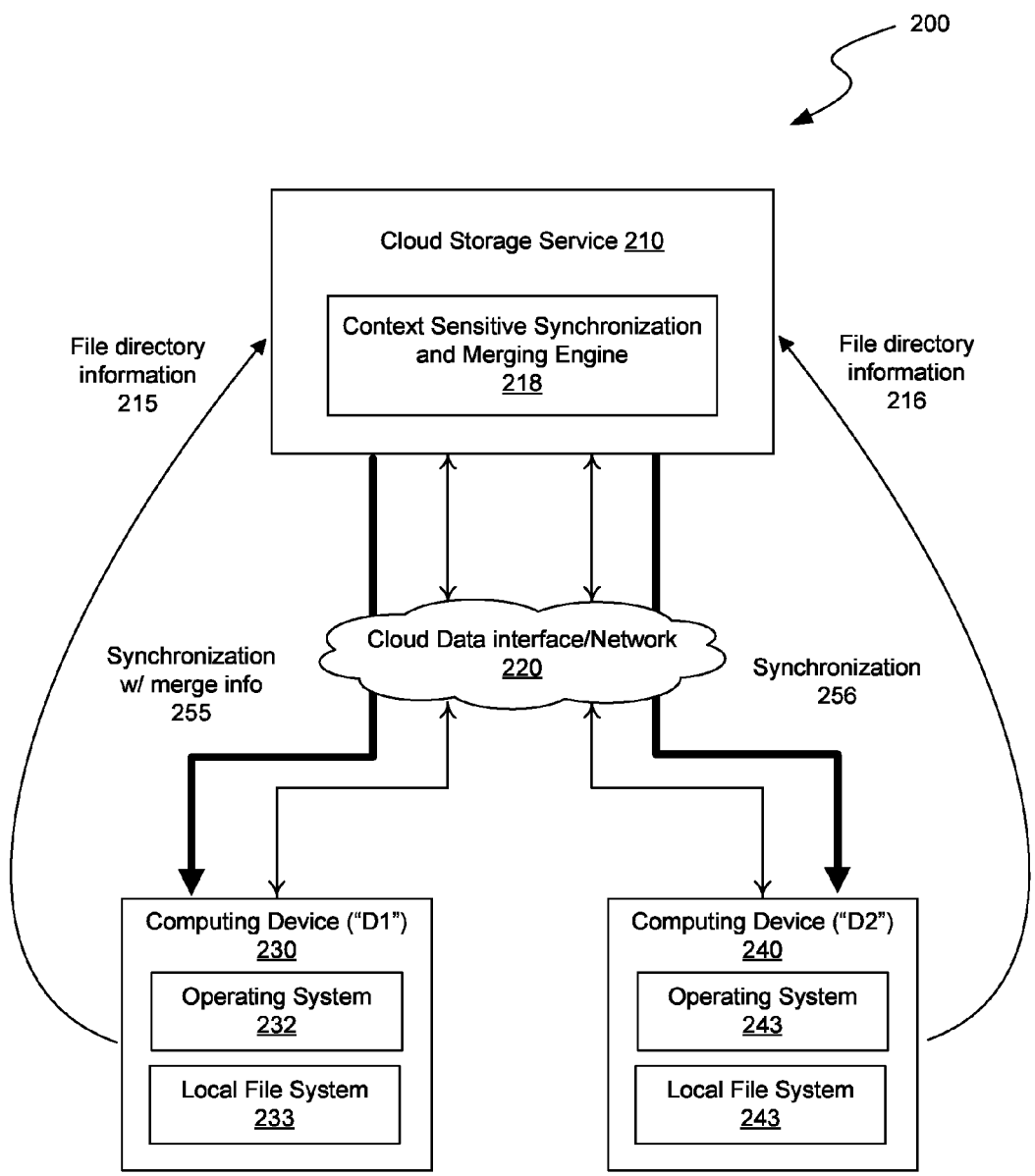

FIG. 2B illustrates a similar example whereby both computing device D1 and D2 provide file directory information to the context sensitive synchronization and merging engine 218. In this example, the context sensitive synchronization and merging engine 218 identifies a file conflict in one or more of the directories and opportunistically remedies the conflict. For example, computing devices D1 and D2 can be taking pictures simultaneously. If the two devices use the same operating system and/or application, e.g., iPhone photo software, then the different photos from the different devices may have the same name. This can occur when, for example, the naming convention is based on timestamps. The system described herein identifies a conflicting photo, determines a device to modify the conflicting photo (i.e., the losing device), and opportunistically directs the device to modify the name of the photo via an instruction that is sent to the losing device, in this case computing device D1. The remaining synchronization proceeds normally.

In one embodiment, the context sensitive synchronization and merging engine 218 detects a conflict between data object information associated with computing device D1 and data object information associated with computing device D2, determines a losing computing device (e.g., D1 in the example), and determines a modification to the data object information associated with the losing device that resolves the conflict (e.g., renaming a particular file). The name is then changed on computing device D1 opportunistically when the first computing device is not accessing the data object. For example, the context sensitive synchronization and merging engine 218 can wait for the first computing device to cease accessing the data object information associated with computing device D1, and resolve the conflict by sending the instruction to the computing device D1 requesting that it perform the modification to the data object information (e.g., rename the conflicting file).

Figure 2C:
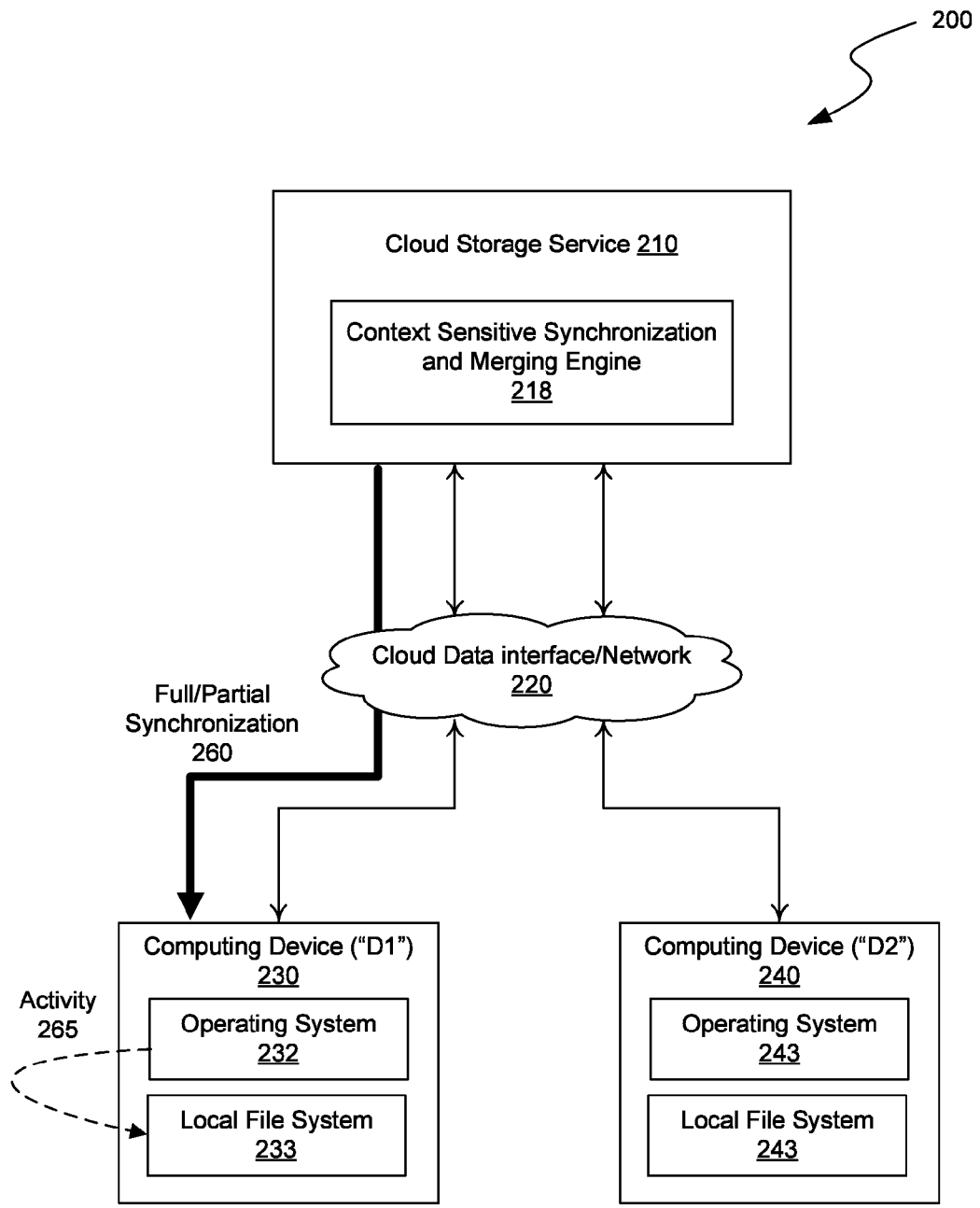

FIG. 2C illustrates an example whereby synchronization can occur without synchronizing the entire contents of one or more data objects or files. FIG. 2D illustrates an example 275 of several stub or partially synchronized files that could be found on a computing device, according to an embodiment.

For example, the context sensitive synchronization and merging engine 218 can detect an activity 265 performed on the local file system 233 or a particular data object. Alternatively or additionally, the computing device can detect this information and provide it to the context sensitive synchronization and merging engine 218. In some embodiments, the synchronization on computing device D1 can include determining the type of activity associated with a particular data object of the local file system 233.

In some embodiments, if the type of activity is not of a first type of activity such as, for example, a display activity, then the context sensitive synchronization and merging engine 218 allows the synchronization to complete while synchronizing less than all of the data associated with the particular data object. For example, stub files as illustrated in FIG. 2D, can be downloaded during the synchronization that do not include the entire data object contents but rather, only specific parts of a data objects. The specific parts can be, e.g., header fields, tag fields, identifier fields, thumbnail field, etc.

However, if the type of activity is a first type of activity such as, for example, a display activity, then the context sensitive synchronization and merging engine 218 allows the synchronization to complete once all of the data associated with the particular data object is synchronized.

Figure 3:
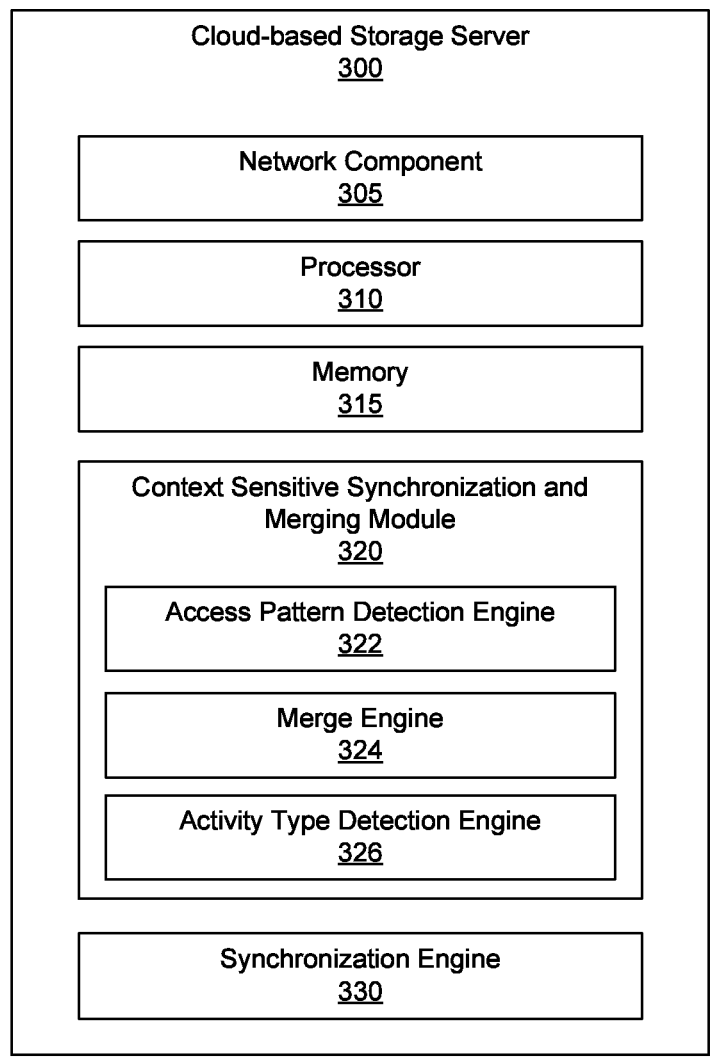
FIG. 3 is a block diagram illustrating example components of a cloud-based storage server in a cloud-based storage environment having a distributed file system.

FIG. 3 is a block diagram illustrating example components of a cloud-based storage server 300 in a cloud-based storage environment having a distributed file system such as, for example, cloud-based storage environment 100 of FIG. 1, according to an embodiment. Cloud-based storage server 300 can be, e.g., a dedicated standalone server, or implemented in a cloud computing service having a plurality of servers. In this example, the cloud-based storage server 110 includes a network component 305, a processor 310, a memory 315, an application classification module 320, and a synchronization module. Additional or fewer components are possible.

The memory 315 can include instructions which when executed by the processor 310 enables the cloud-based storage server 300 to perform the functions described herein including classification of the data objects based on application creation and/or access information. The network component 305 is configured for network communications with the computing devices, e.g., computing devices 130-150. The network communications can include, for example, receiving data files from the computing devices, sending data files to the computing devices upon access requests or synchronization events, or receiving requests for backup, access, or synchronization.

The context sensitive synchronization and merging module 320 implements the context sensitive synchronization and merging engine 118 of FIG. 1 for facilitating context sensitive synchronization and seamless merging of conflicting data objects. As shown in the example of FIG. 3, context sensitive synchronization and merging module 320 includes an access pattern detection engine 322, a merge engine 324, and an activity type detection engine 326. The access pattern detection engine 322 identifies expected access patterns associated with specific directories and/or file types. For example, when synchronizing a particular directory on a device, the system can identify applications installed on the device. The synchronization of files on the device is then optimized such that only the files and/or sub-directories associated with the installed applications are propagated and/or otherwise updated.

The merge engine 324 provides the ability to merge concurrent modifications to the same directory by opportunistically renaming conflicting files when the conflicting files are not being accessed by applications. For example, two or more devices can be taking pictures simultaneously. If the two devices use the same operating system and/or application, e.g., iPhone photo software, then the different photos from the different devices may have the same name. This can occur when, for example, the naming convention is based on timestamps. The system described herein identifies a conflicting photo, determines a device to modify the conflicting photo (i.e., the losing device), opportunistically directs the device to modify the name of the photo via an instruction that is sent to the losing device.

The activity type detection engine 326 detects and distinguishes between various different types of activities occurring on or at a device during synchronization of the device with the distributed cloud-based file system. Distinguishing between various activities allows the system to synchronize (e.g., download and/or otherwise update files on the device) with minimal file system information (i.e., less than all of the file system information). For example, the system can distinguish media scan or thumbnailing activity occurring on the device from display activity occurring on the device and allow the media scan or thumbnailing activity to complete while updating only portions of some or all of the files. The ability to complete the media scan or thumbnailing activity while downloading or updating only portions of some or all of the files saves both bandwidth and memory (e.g., flash memory) space on the device.

The synchronization engine 330 performs the server-side aspects associated with the automatic synchronization of application states across the multiple computing devices using the configurable synchronization mechanisms described herein.

Figure 4:
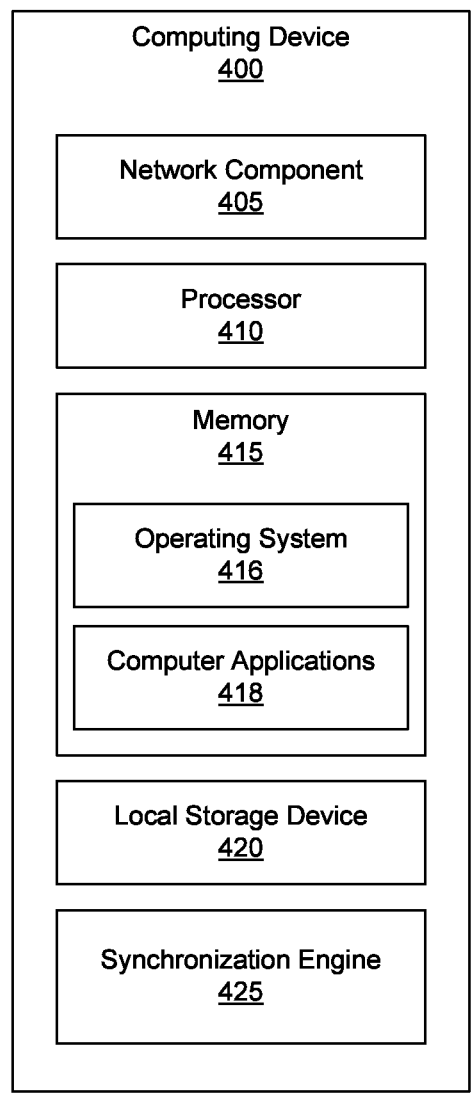
FIG. 4 is a block diagram illustrating example components of a computing device in a cloud-based storage environment having a distributed file system.

FIG. 4 is a block diagram illustrating example components of a computing device 400 in a cloud-based storage environment having a distributed file system such as, for example, cloud-based storage environment 100 of FIG. 1, according to an embodiment. The computing device 400 can be one of computing devices 130-150 of FIG. 1, although alternative configurations are possible. The computing device 400 can include a network component 405, a processor 410, a memory 415, a local storage device 420, and a creation/access tracking engine 425. The memory 415 can store instructions of the operating system 416 for computing device 400. The memory 415 can further store instructions of the computer applications 418 designed to run or execute at (or on) the computing device 400.

The network component 405 can be capable of switching between states including a high power consumption state and a low power conservation state. The network component 405 can be, e.g. a Wi-Fi networking adapter, a cellular phone networking adapter, or a combination thereof. The processor 410 is configured to execute the computer applications 416 and the operating system 132 of the computing device 400. The memory 415 stores instructions of the operating system 416 which, when executed by the processor 410, cause the operating system 416 to perform processes for realizing certain functionalities of the computing device 400. For instance, the process of the operating system 416 can facilitate access of data objects from the distributed file system, tracking of the applications accessing these data objects, and various transfers of data from or to other computing devices 140-150 and/or cloud-based storage server 300.

The local storage device 420, as described above, can store the instructions, the operating system 416, user data such as profile data of the user, data files of the user, and any other data necessary for the operation of the computing device 400 and execution of the computer applications 418.

The computing device 400 also includes the synchronization engine 425. The synchronization engine 425 performs the client-side aspects associated with the automatic synchronization of application states across the multiple computing devices using the configurable synchronization mechanisms described herein.

Figure 5:
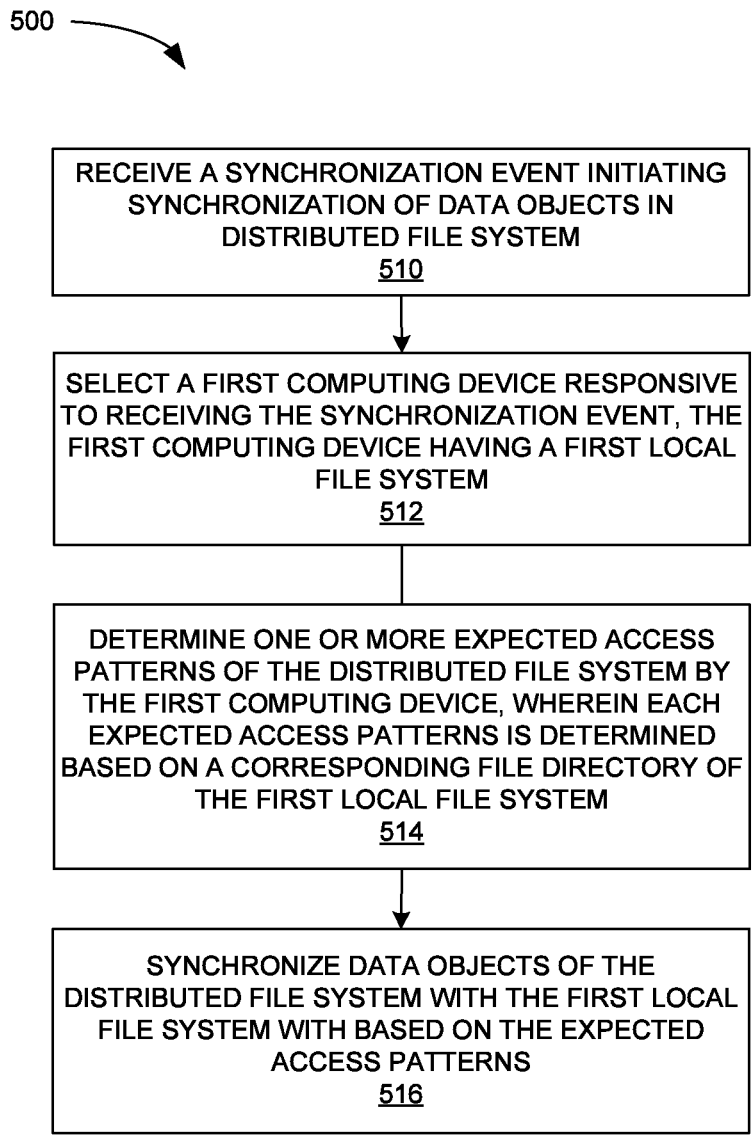
FIG. 5 is a flow diagram illustrating an example process of context sensitive synchronization of a distributed cloud-based file system across multiple devices.

FIG. 5 is a flow diagram illustrating an example process 500 of context sensitive synchronization of a distributed cloud-based file system across multiple devices, according to an embodiment. One or more cloud-based storage servers of a cloud storage service e.g., cloud storage service 110 of FIG. 1, among other functions, perform the example process 500.

To begin, at step 510, the cloud-based storage server receives a synchronization event initiating synchronization of data objects in distributed file system. The synchronization event can be triggered by a computing device and/or the cloud-based storage server. The data objects can be any type of data file. For example, a data object can be an image, an audio file, a video file, a document, an email, etc. The format of the file can include, but is not limited to, any of a Joint Photographic Experts Group (JPEG), a bitmap, a Microsoft Word document, a Portable Document Format (PDF), MP3, Advanced Audio Coding (AAC), etc. At step 512, the cloud-based storage server selects a first computing device responsive to receiving the synchronization event. As discussed herein, the first computing device has a first local file system. Furthermore, it is appreciated that any number of computing devices can be selected for synchronization in parallel, in sequence or in any combination thereof.

At step 514, the cloud-based storage server determines one or more expected access patterns of the distributed file system by the first computing device, wherein each expected access patterns is determined based on a corresponding file directory of the first local file system. In one embodiment, two or more directories of the first local file system have different determined expected access patterns of the distributed file system by the first computing device. In one embodiment, determining the expected access patterns of the first local file system by the user of the first computing device includes recognizing a first directory on the first local file system of the first computing device, identifying files in the first file directory of the first local file system as application identifiers, scanning the application identifiers to identify the applications installed on the first computing device, and determining a first expected access pattern based on the applications installed on the first computing device.

The first expected access pattern identifies only directories associated with application installed on the first computing device.

Lastly, at step 156, the cloud-based storage server synchronize data objects of the distributed file system with the first local file system with based on the expected access patterns.

Figure 6:
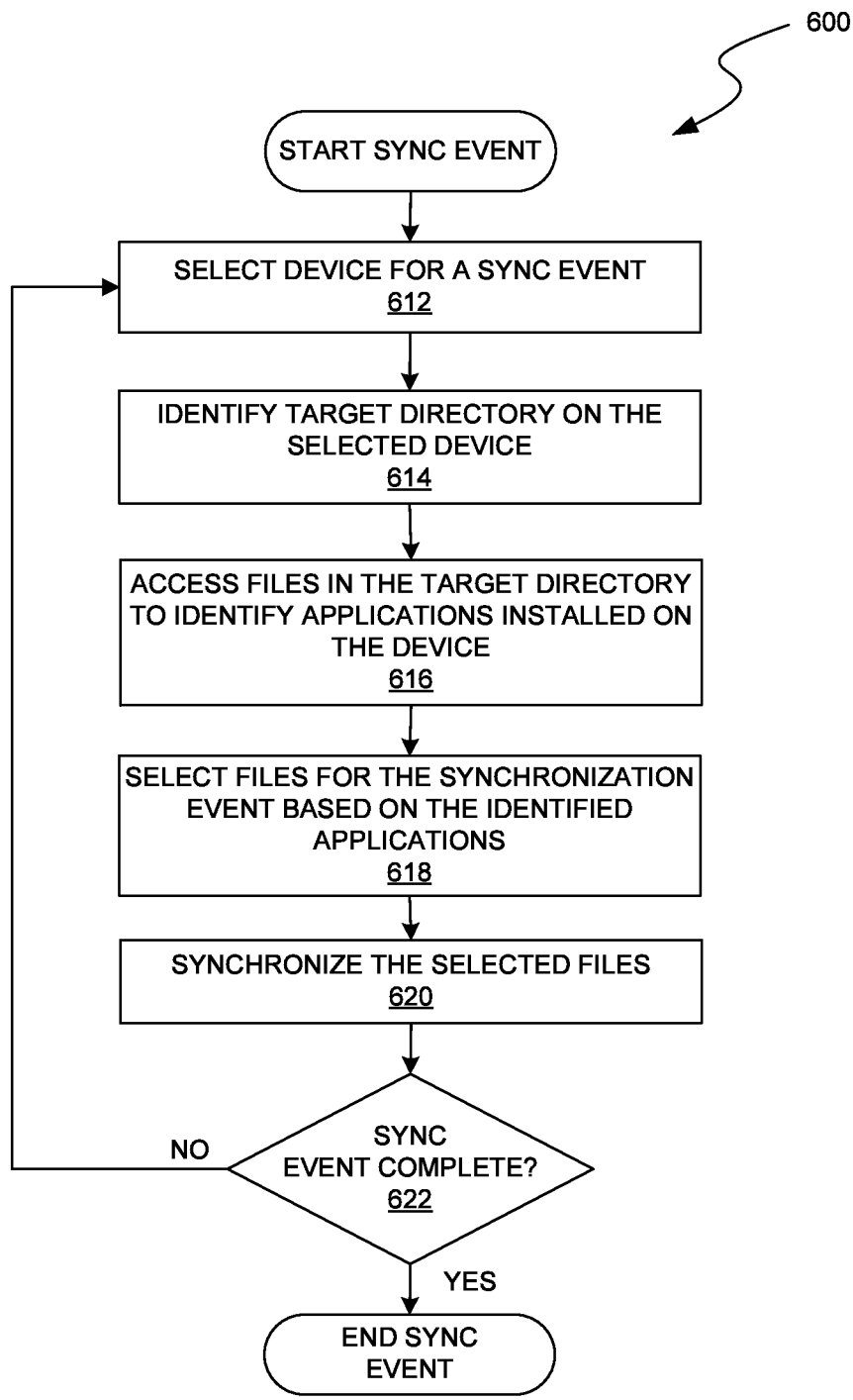
FIG. 6 is a flow diagram illustrating an example process of synchronization based on access pattern detection.

FIG. 6 is a flow diagram illustrating an example process 600 for synchronization based on access pattern detection, according to an embodiment. One or more cloud-based storage servers of a cloud storage service e.g., cloud storage service 110 of FIG. 1, among other functions, perform the example process 600. To begin, at step 612, the cloud-based storage server selects a device for a synchronization event. As discussed above, the synchronization event can be triggered by a computing device and/or the cloud-based storage server. At step 614, the cloud-based storage server identifies a target directory on the selected device, and at step 616, accesses files in the target directory to identify applications installed on the device.

At step 618, the cloud-based storage server selects files for the synchronization event based on the identified applications and, at step 620, synchronizes the selected files. For example, when synchronizing a particular directory on a device, the system can identify applications installed on the device. The synchronization of files on the device is then optimized such that only the files and/or sub-directories associated with the installed applications are propagated and/or otherwise updated. At decision step 622, the cloud-based storage server determines if the synchronization is complete. For example, the synchronization is complete once all modified files in the distributed file system are either synchronized with the local file system of the computing device or it is determined that the data objects or files should not be updated.

Figure 7:
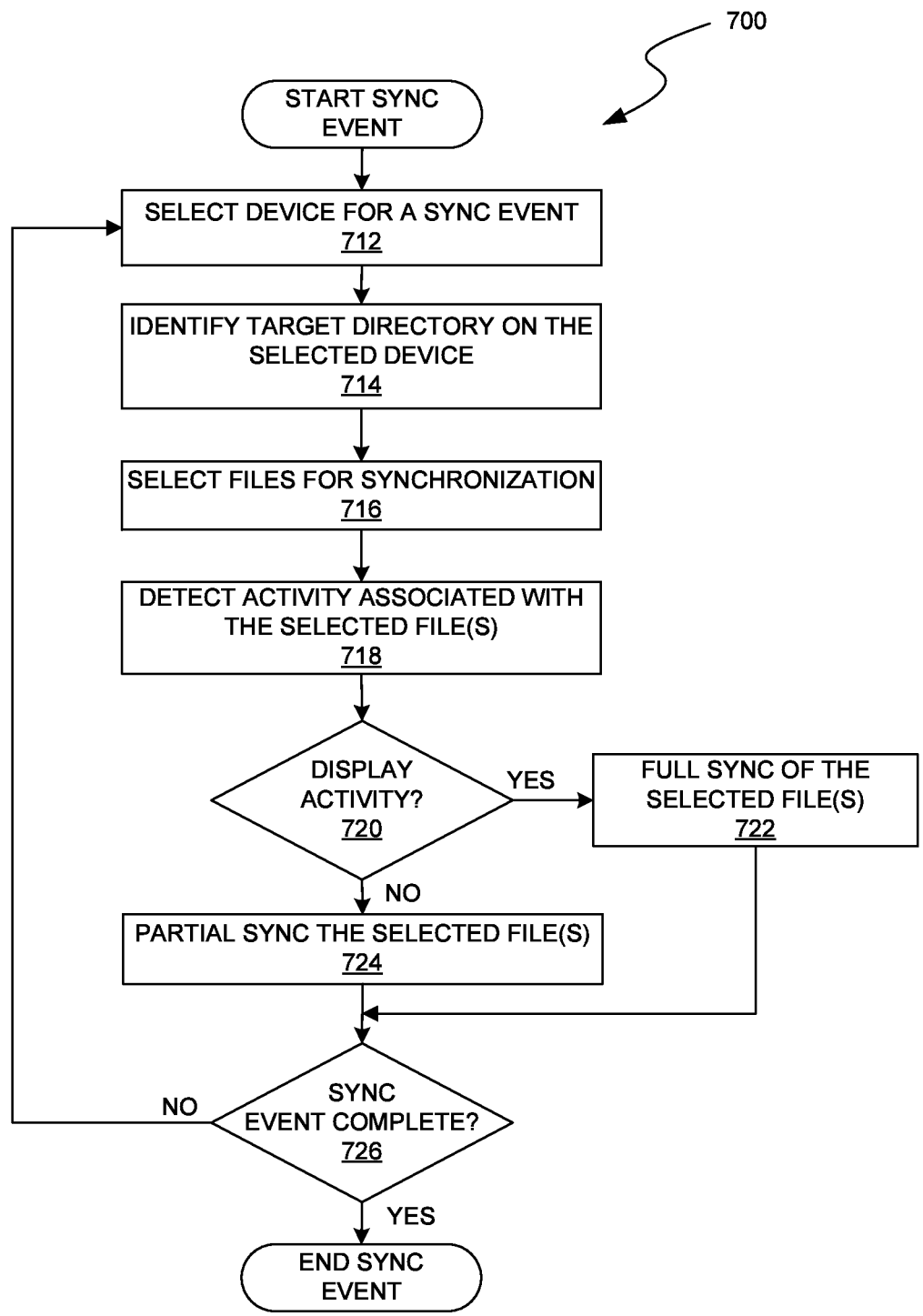
FIG. 7 is a flow diagram illustrating an example process of synchronization with activity detection functionality.

FIG. 7 is a flow diagram illustrating an example process 700 for synchronization with activity detection functionality, according to an embodiment. One or more cloud-based storage server of a cloud storage service e.g., cloud storage service 110 of FIG. 1, among other functions, perform the example process 700. To begin, at step 712, the cloud-based storage server selects a computing device for a synchronization event. As discussed above, it is appreciated that any number of computing devices can be selected for synchronization in parallel, in sequence or in any combination thereof.

At step 714, the cloud-based storage server identifies a target directory on the selected device, and at step 716, selects files for synchronization. At step 718, the cloud-based storage server detects activity associated with the selected files. In some embodiments, the system can distinguish between various different activities occurring on or at a device during synchronization of the device with the distributed cloud-based file system. Distinguishing between various activities allows the system to synchronize (e.g., download and/or otherwise update files on the device) with minimal file system information (i.e., less than all of the file system information). For example, the system can distinguish media scan or thumbnailing activity occurring on the device from display activity occurring on the device and allow the media scan or thumbnailing activity to complete while updating only portions of some or all of the files. The ability to complete the media scan or thumbnailing activity while downloading or updating only portions of some or all of the files saves both bandwidth and memory (e.g., flash memory) space on the device.

At decision step 720, the cloud-based storage server determines if the activity is a display activity. A display activity can be, for example, an activity on the computing device that has caused or will cause the data object to be read in full and/or otherwise displayed to a user of the computing device. If the activity is a display activity, at step 722, the cloud-based storage server synchronizes the entire selected file(s). This is because the computing device will need the entire file and not just a portion of the file. Alternatively, at step 724, if the activity is a display activity, the cloud-based storage server performs a partial synchronization of the selected file(s). This can include, for example, download just a portion of the file to a stub on the local file system of the computing device. Of course, if or when, this stub is accessed or the computing system or server believes it is likely to be accessed, the remainder of the stub file is filled synchronized (e.g., filled in).

Lastly, at decision step 726, the cloud-based storage server determines if the synchronization is complete. For example, the synchronization is complete once all modified files in the distributed file system are either synchronized with the local file system of the computing device or it is determined that the data objects or files should not be updated.

Figure 8:
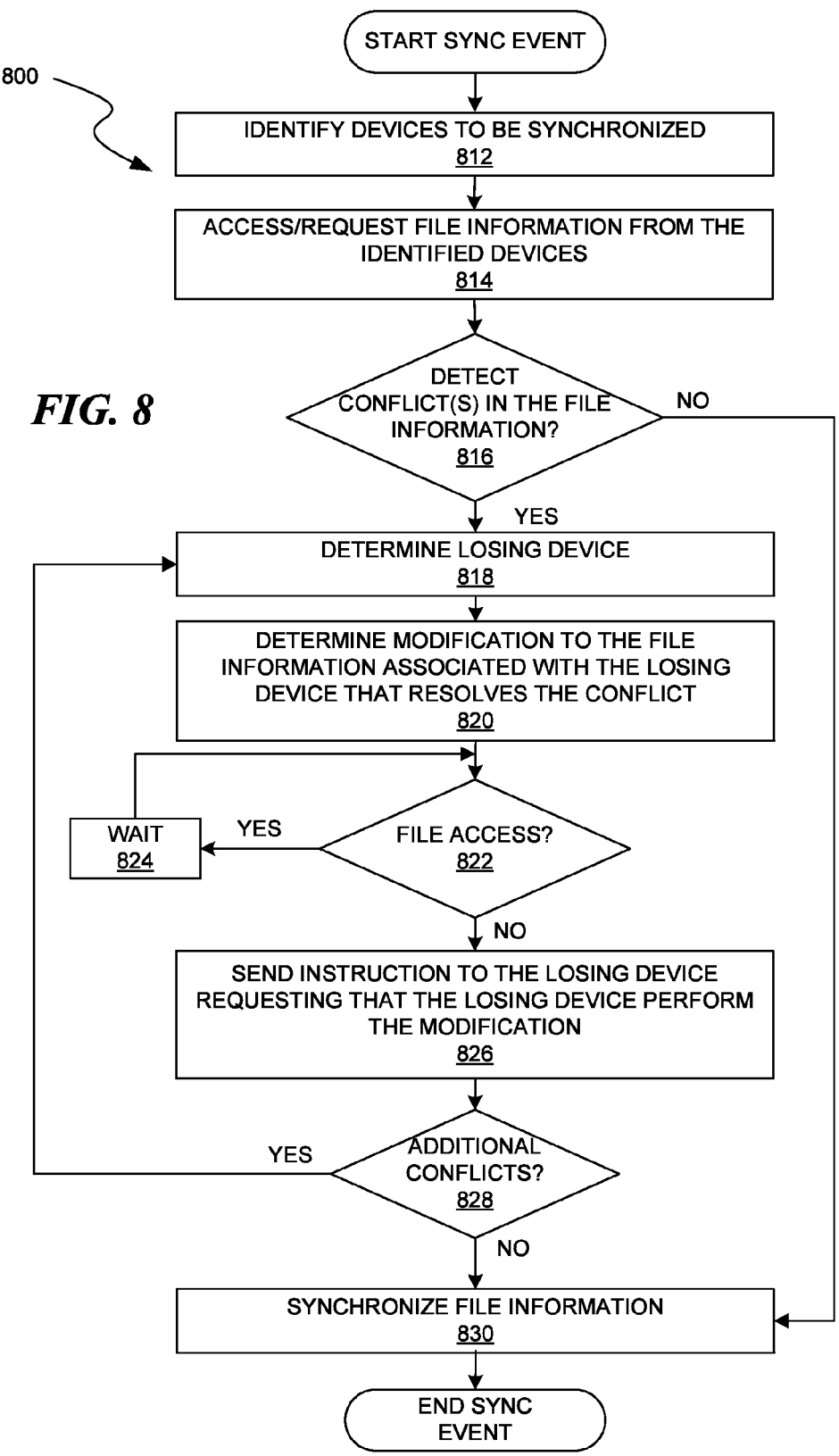
FIG. 8 is a flow diagram illustrating an example process for synchronization based on access pattern detection and seamless merging semantics.

FIG. 8 is a flow diagram illustrating an example process 800 for synchronization based on access pattern detection and seamless merging semantics, according to an embodiment. One or more cloud-based storage servers of a cloud storage service e.g., cloud storage service 110 of FIG. 1, among other functions, perform the example process 800. To begin, at step 812, the cloud-based storage server identifies one or more devices to be synchronized (e.g., for a synchronization event). As discussed above, the synchronization event can be triggered by a computing device and/or the cloud-based storage server. At step 814, the cloud-based storage server accesses and/or otherwise requests file information from the identified devices. At decision step 816, the cloud-based storage server determines if conflicts are detected in the file information. For example, for particular file directories such as the "/sdcard/DCIM" directory, which take advantage of the JEITA CP-3461 specification, some file names, such as those of image files, may be assigned the same name if they were taken on different device at or near the same time. The cloud-based storage server detects this name conflict.

At step 818, the cloud-based storage server determines which of the devices must change the file information (e.g., the file name). The determination of which device is the losing device could be made randomly, based on which device is more likely to be used/unused, etc. At step 820, the cloud-based storage server determines modifications to the file information associated with the losing device that resolve the conflict. For example, the cloud-based storage server can decide that the losing device should change the conflicting image file from file "A.jpg" to file "B.jpg."

The cloud-based storage server then opportunistically attempts to apply the modification when the file to be modified is not being accessed by applications, the operating system of the computing device, etc. Accordingly, at decision step 822, the cloud-based storage server determines if the file (or data object) to be modified is being accessed by applications, the operating system of the computing device, etc. If so, the cloud-based storage server, at step 824, waits until it is no longer being accessed, e.g., when the application has quit or can be restarted, and then continues with process 800.

At step 826, the cloud-based storage server sends an instruction to the losing device requesting that the losing device perform the modification. At decision step 828, the cloud-based storage server determines if any additional conflicts exist and, if so, continues at step 818. If no additional conflicts exist, at step 830, the cloud-based storage server continues with synchronization of the remaining data objects (e.g., files and/or information) until the synchronization is complete. For example, the synchronization is complete once all modified files in the distributed file system are either synchronized with the local file system of the computing device or it is determined that the data objects or files should not be updated.

Figure 9:
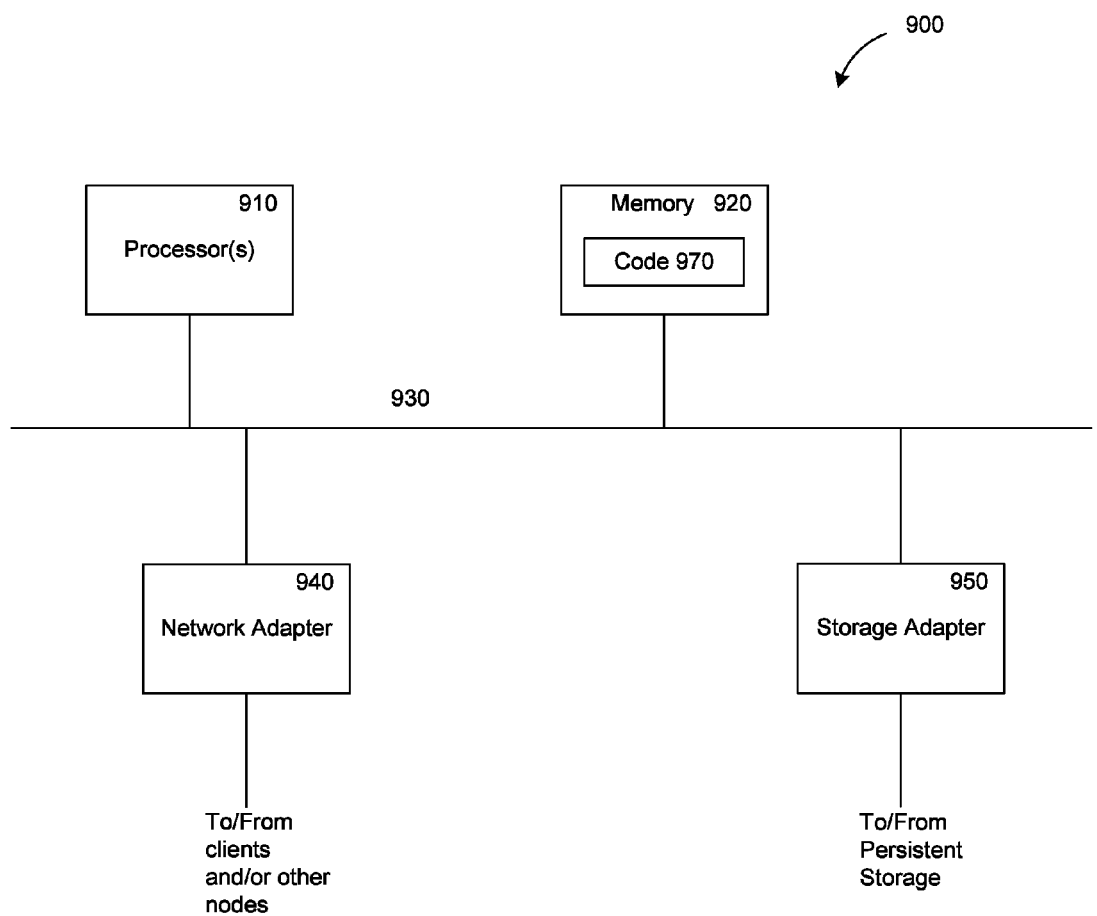
FIG. 9 is a block diagram of a computer system as may be used to implement features of some embodiments of the disclosed technology.

FIG. 9 is a block diagram of a computer system as may be used to implement features of some embodiments of the disclosed technology. The computing system 900 may be used to implement any of the entities, components or services depicted in the examples of FIGS. 1-6 (and any other components described in this specification). The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described technology. In addition, the data structures and message structures may be stored or transmitted via a data transmission medium, such as a signal on a communications link. Various communications links and/or networks may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the computing system 900 by downloading it from a remote system through the computing system 900 (e.g., via network adapter 930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method, comprising:
receiving, by a cloud-based server, a synchronization event initiating synchronization of data objects in distributed file system;

selecting a first computing device responsive to receiving the synchronization event, the first computing device having a first local file system;

determining, by the cloud-based server, one or more expected access patterns of the distributed file system by the first computing device, wherein each expected access patterns is determined based on a corresponding file directory of the first local file system; and synchronizing data objects of the distributed file system with the first local file system with based on the expected access patterns, wherein performing the synchronization on the first computing device further comprises determining a type of activity associated with a particular data object of the first local file system, wherein if the type of activity is not of a first type of activity, allowing the synchronization to complete while synchronizing less than all of the data associated with the particular data object, and wherein if the type of activity is of the first type of activity, allowing the synchronization to complete once all of the data associated with the particular data object is synchronized.

2. The computer-implemented method of claim 1, wherein two or more directories of the first local file system have different determined expected access patterns of the distributed file system by the first computing device.

3. The computer-implemented method of claim 1, wherein determining the expected access patterns of the distributed file system by the first computing device comprises:

recognizing a first directory on the first local file system of the first computing device;

identifying files in the first file directory of the first local file system as application identifiers;

scanning the application identifiers to identify the applications installed on the first computing device;

determining a first expected access pattern based on the applications installed on the first computing device, wherein the first expected access pattern identifies only directories associated with the application installed on the first computing device.

4. The computer-implemented method of claim 1, further comprising:

detecting a conflict between data object information associated with the first computing device and data object information associated with a second computing device;

determining a losing computing device of the first computing device and the second computing device; and determining a modification to the data object information associated with the losing device that resolves the conflict.

5. The computer-implemented method of claim 4, further comprising:

waiting for the first computing device to cease accessing the data object information associated with the losing device;

resolving the conflict by sending the instruction to the losing device requesting that the losing device perform the modification to the data object information.

6. The computer-implemented method of claim 5, wherein the specific parts of the particular data object include header fields, tag fields, or identifier fields.

7. The computer-implemented method of claim 5, wherein the specific parts of the particular data object Include a thumbnail field.

8. The computer-implemented method of claim 1, wherein the first type of activity comprises a display activity.

9. The computer-implemented method of claim 1, wherein the less than all of the data associated with the particular data object includes specific parts of the particular data object.

10. A cloud-based server system, comprising:

a processor;

a memory system having instructions stored thereon, wherein the instructions, when executed by the processor, cause the cloud-based system to:

select a first computing device responsive to receiving a synchronization event initiating synchronization of data objects in distributed file system, the first computing device having a first local file system;

determine or more expected access patterns of the distributed file system by the first computing device, wherein each expected access patterns is determined based on a corresponding file directory of the first local file system; and synchronize data objects of the distributed file system with the first local file system with based on the expected access patterns, wherein to perform the synchronization on the first computing device, the instructions, when executed by the processor, further cause the cloud-based system to determine a type of activity associated with a particular data object of the first local file system, wherein if the type of activity is not of a first type of activity, allowing the synchronization to complete while synchronizing less than all of the data associated with the particular data object, and wherein if the type of activity is of the first type of activity, allowing the synchronization to complete once all of the data associated with the particular data object is synchronized.

11. The cloud-based server system of claim 10, wherein two or more directories of the first local file system have different determined expected access patterns of the distributed file system by the first computing device.

12. The cloud-based server system of claim 10, wherein to determine the expected access patterns of the distributed file system by the first computing device, wherein the instructions, when executed by the processor, further cause the cloud-based system to:

recognize a first directory on the first local file system of the first computing device;

identify files in the first file directory of the first local file system as application identifiers;

scan the application identifiers to identify the applications installed on the first computing device;

determine a first expected access pattern based on the applications installed on the first computing device, wherein the first expected access pattern identifies only directories associated with the application installed on the first computing device.

13. The cloud-based server system of claim 10, wherein the instructions, when executed by the processor, further cause the cloud-based system to:

detect a conflict between data object information associated with the first computing device and data object information associated with a second computing device;

determine a losing computing device of the first computing device and the second computing device;

determine a modification to the data object information associated with the losing device that resolves the conflict;

wait for the first computing device to cease accessing the data object information associated with the losing device; and resolve the conflict by sending the instruction to the losing device requesting that the losing device perform the modification to the data object information.

14. The cloud-based server system of claim 10, wherein the first type of activity comprises a display activity, wherein the less than all of the data associated with the particular data object includes specific parts of the particular data object, and wherein the specific parts of the particular data object include header fields, tag fields, identifier fields, or thumbnail fields.

15. A non-transitory computer-readable storage medium storing instructions to be implemented by a computer system having a processor, wherein the instructions, when executed by the processor, cause the computer system to:

select a first computing device responsive to receiving a synchronization event initiating synchronization of data objects in distributed file system, the first computing device having a first local file system;

determine or more expected access patterns of the distributed file system by the first computing device, wherein each expected access patterns is determined based on a corresponding file directory of the first local file system, wherein two or more directories of the first local file system have different determined expected access patterns of the distributed file system by the first computing device; and synchronize data objects of the distributed file system with the first local file system with based on the expected access patterns, wherein performing the synchronization on the first computing device further comprises determining a type of activity associated with a particular data object of the first local file system, wherein if the type of activity is not of a first type of activity, allowing the synchronization to complete while synchronizing less than all of the data associated with the particular data object, and wherein if the type of activity is of the first type of activity, allowing the synchronization to complete once all of the data associated with the particular data object is synchronized.

16. The computer readable medium of claim 15, wherein to determine the expected access patterns of the distributed file system by the first computing device, wherein the instructions, when executed by the processor, further cause the computer system to:

recognize a first directory on the first local file system of the first computing device;

identify files in the first file directory of the first local file system as application identifiers;

scan the application identifiers to identify the applications installed on the first computing device;

determine a first expected access pattern based on the applications installed on the first computing device, wherein the first expected access pattern identifies only directories associated with the application installed on the first computing device.

* * * * *